Dec. 2, 1969  E. W. STARR ET AL  3,481,724
METHOD AND APPARATUS FOR TEMPERING GLASS
SHEETS BETWEEN OPPOSED GAS FLOWS
Filed July 21, 1966  2 Sheets-Sheet 1

INVENTORS
EUGENE W. STARR and
GEORGE W. MISSON

BY Chisholm and Spencer
ATTORNEYS 3,481,724
METHOD AND APPARATUS FOR TEMPERING
GLASS SHEETS BETWEEN OPPOSED GAS
FLOWS
Eugene W. Starr, Allison Park, and George W. Misson, Pittsburgh, Pa., assignors to PPG Industries, Inc., Pittsburgh, Pa., a corporation of Pennsylvania
Filed July 21, 1966, Ser. No. 566,938
Int. Cl. C03b 39/00, 27/00
U.S. Cl. 65—25                                    2 Claims

ABSTRACT OF THE DISCLOSURE

A method of controlling the blow back of glass from a tempering section to the heating section by dividing the flows and reducing the pressure of the air to a level below the force, driving the glass from the heating section into the quench.

---

This invention relates to a method and apparatus for controlling the flow of support and cooling gas used in the cooling quench and especially useful when tempering ⅛″ glass sheets in a gas supported hearth of the type disclosed in U.S. 3,223,501, issued on Dec. 14, 1965, to Fredley et al.

In the apparatus, a plurality of modules are disposed transversely of the direction of glass travel and provide both a supporting gas and a cold application to the glass in the quench section thereof. Heat exchange fluid, such as cooling air, is emitted from the fluid emission modules and applied to both surfaces of a supported glass sheet. A cooling fluid is applied under pressure to quench a glass sheet passing between the module beds. When this apparatus is used to temper ⅛″ glass sheet, a condition known as "blow back" develops.

In the quench section of the gas hearth apparatus a plurality of modules are disposed transversely of the direction of glass travel to provide both a supporting gas and a cold application to the glass in a quenching section to temper the glass. Tempering operations require a rapid transfer of heat from the environment to the cooling quench. To achieve this rapid transfer of heat, air is supplied at high pressure and velocity to the major surfaces of the glass while supported upon the supporting gases.

Heat exchange fluid, such as cool air, is emitted from the modules and applied to both surfaces of a gas supported glass sheet. A cooling fluid is applied under pressure to quench the glass sheet passing between the module beds. When this apparatus is used to temper ⅛″ thick glass sheet, due to the high velocity of the cooling gases supplied, the glass sheet entering from the heating section to the quench section is blown back into the heating section. This condition is known as "blow back." The applicants' invention has provided a solution to the problem of blow back without seriously interfering with the heat transfer of the cooling gas used in the quench operation.

Applicants' invention provides apparatus and a method for supplying quench gas at a high velocity sufficient to temper the glass and provides a method of eliminating the blow back condition. The first several rows of the quench are arranged so that the gas-emitting sources or modules are arranged to provide opposing streams of quench gas which collide in the area between the supporting bed and the upper gas supply source. The division of the quench streams is such that a component flows counter to the direction of glass travel, i.e., downstream from the heating section, throughout the quenching section. Applicants' invention controls the component of the stream directed counter to the glass travel and provides apparatus for exercising this control.

It is well known in the tempering of glass that, in order to produce a glass of even quality, it is necessary that the initial tempering be uniform in heat transfer from both major surfaces of the glass sheet. However, after the initial tempering operation, it is not necessary that heat continue to be removed at absolutely uniform rates. The necessity to begin the initial tempering with uniform cooling rates made it impossible to use a staggered module arrangement as subsequently used in the quench for tempering in the ⅛″ glass tempering operation.

Air flowing equally from the opposing quenches divides into a stream approximately parallel to the direction of glass travel. One half of the stream forms a force or resistance to glass entry into the gas hearth type quench. Applicants' invention is designed to facilitate entry of the glass into the quench by eliminating this "blow back" condition.

A full description of the invention may be obtained by referring to the accompanying specification and drawings in which.

Figure 1:
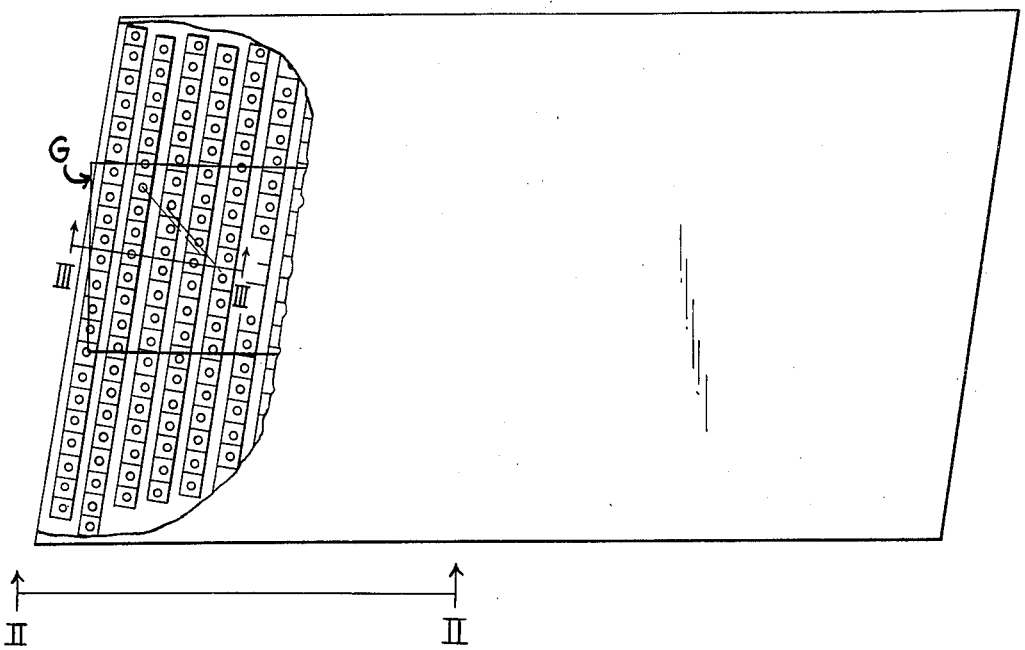
FIG. 1 illustrates a quench bed in partial section.
Figure 2:
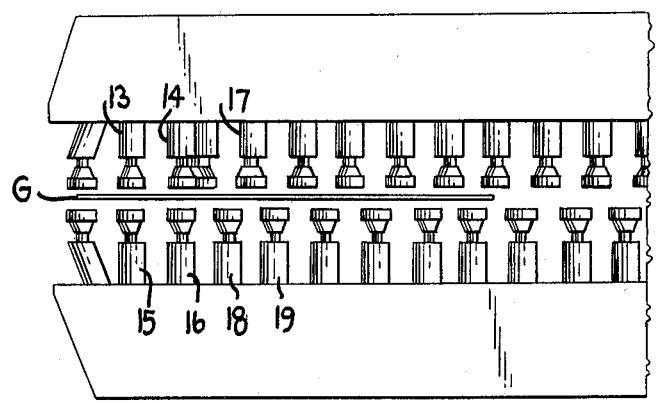
FIG. 2 is a cross section of the bed, taken along the section lines II.

In operation, a gas hearth quench receives a glass sheet at deformation temperature from the heating section, not shown. The leading edge of the glass passes from the heating section, between the quench modules, as illustrated diagrammatically in FIGS. 2 and 3. Air is supplied through modules 13, 14, 15 and 16, and the collision of the air streams, indicated at 20 and 21, divides the streams into components 22 and 23. One component 22 runs counter to the edgewise direction of movement of the glass sheet.

The tempering of glass ⅛″ thick requires a rapid heat transfer from the glass to the cooling medium. This was accomplished by a high volume of air coming through the quench modules. When attempts were made to temper ⅛″ thick glass using this method, the resistance to the glass passage was greater than the forward inertial force of the lightweight sheets. This force of resistance is present due to the component of the air stream directed counter to the direction of glass movement. This force of resistance is present in all similar gas hearth quench installations. The major component of the force is due to the merger and outflow of air streams from opposing quench module strips. This flow is illustrated diagrammatically in FIG. 3. It may be seen that the first three rows of modules produce an air flow from opposing modules which impacts approximately along the center line.

To leave by a path of least resistance, the air flow turns approximately 90° and parallel to the direction of glass travel. Approximately one-half of the the flow will oppose the desired glass motion by pressure on the lead edge of the glass with a force proportional to the glass plus air velocity squared. As the glass approaches the gap between opposed module strips, the force is considerably increased. This is probably because the flow area is then reduced, increasing the velocity and static pressure within the gap. For forward motion, the glass has only latent energy of motion and the motive power of the edge drive wheels.

Figure 3:
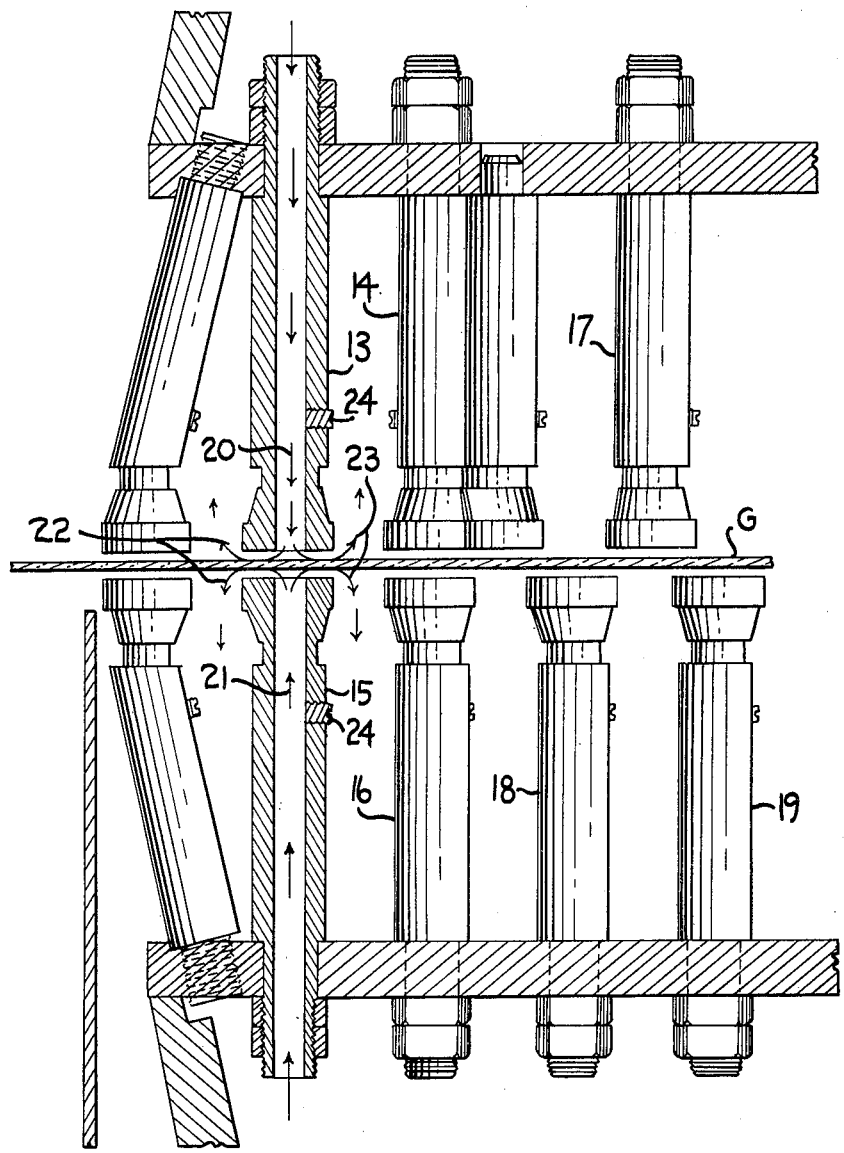
FIG. 3 is an enlarged section of the bed, taken along lines III.

It was discovered that a suitable reduction in mass air flow to these first three rows of modules would reduce velocity forces considerably and hence the glass energy force can carry it into the quench zone, beyond the initial force barrier. Subsequent staggering of the modules, as illustrated by modules 11, 18 and 19, does not result in a component of force directly in opposition to glass travel. Hence, there is no problem of blow back. The air flow is controlled within the modules by reduction in area, which can be accomplished by operation of controls on barrier set cross-wise in the supply pipes. A valve 24 is inserted into the stem of a module, as shown in FIG. 3, to provide a control for reducing air pressure.

A series of tests were run on a module test apparatus to determine both flow and heat transfer values with preferred embodiment valve turned to several setting positions. A typical test result indicated that full throttle effect and a plenum pressure of 2 oz. per square inch (o.s.i.) was .52 standard cubic feet per minute (s.c.f.m.) compared with throttle plates in full open setting.

Glass support characteristics with fully-throttled conditions, i.e., 3 o.s.i. plenum pressure, showed that ¼″ thick glass flowed .010″ above the generative surface and ⅛″ thick glass flowed .015″ above the generative surface.

Laboratory test results and field trials, using applicants' invention, showed that blow back into the furnace was reduced with throttles turned in only in the first three rows of module stems. Capability of transporting and satisfactorily tempering ⅛″ thick glass at 48 ounces per square inch plenum pressure was demonstrated.

The applicants' invention utilizes the first rows of modules in an air support quench of the type shown in U.S. Patent 3,223,501. In the tempering operation, the glass sheets are placed upon a suitable run-in roll and pass through the hot gas heating section and the glass is elevated to a deformation temperature. The modules must directly support the leading edge of the glass as it passes from the heating zone to the quench zone and simultaneously begin the tempering of the glass. The tempering requires a high initial cooling rate to satisfactorily temper the glass. This high rate contributed to the blow back problem. A reduction of the quench pressure in the first rows of modules reduces only slightly the ability to temper ⅛″ glass while permitting the glass to enter the quench.

Tempered ⅛″ glass is a valuable product used in automobile side lights and rear lights, especially in the automobile convertible top. Safety requirements heretofore would not permit the use of ⅛″ glass because of the inability to temper the product. Applicants' apparatus and method have produced a commercially satisfactory method of tempering ⅛″ glass on a gas hearth quench.

To provide means of propulsion, a series of driving wheels, not shown, are lined along the side of the gas hearth bed. A typical bed is tilted at angle from the vertical to provide a component of force directing the glass against the driving wheels. It is readily seen that the frictional engagement between the minor edge of the glass and a major driving wheel does not result in a great deal of propelling force.

In the quenching section, air at an ambient temperature of approximately 100° F. is supplied to the upper and lower plenum chambers to provide plenum pressures of about 1.37 and 0.75 p.s.i. The module orifice reduces this pressure to about ⅛ of the plenum pressure as the air escapes into the cavities.

The glass travels through the seven feet of the quench zone in about 30 seconds. In the initial 15 seconds, the temperature of the glass is lowered through its annealing range. As the glass enters the first three sections of the quench, the air supplied to the modules is reduced so that the component of air, directed counter to the direction of glass travel, is reduced below that pressure which will impede entry of the glass between the quench modules. The flow of gas may be reversed by providing orifices or pressure drop devices in the outlets and in such cases provide a continuous support zone communicating with individual exhaust modules.

We claim:
1. A method of tempering sheets of glass comprising:
   moving sheets of glass along a path of travel while said sheets are at least partially supported by a support gas into a tempering zone through an entrance thereto,
   directing a plurality of first streams of fluid toward the path of travel of said glass sheets from above and below said path of travel, said first fluid streams being at a temperature and pressure sufficient to cool said glass sheets and at least partially support said glass sheets during the movement thereof through said tempering zone, each said first streams of fluid from above said path of travel being offset with respect to each adjacent fluid stream from below said path of travel, and
   directing a plurality of second streams of cooling fluid from above and below the path of travel of said sheets of glass along the entrance to said tempering zone at a pressure less than that of said first streams of fluid, each of said second fluid streams from above said glass path of travel being aligned with a fluid stream from below said glass path of travel.
2. An apparatus for controlling the temperature of sheets of glass moving along a path of travel while supported by a supporting gas comprising:
   (a) an upper plenum chamber,
   (b) a lower plenum chamber, said upper and lower plenum chambers being positioned opposite one another on opposite sides of the path of travel of said glass sheets extending through an entrance between said plenum chambers,
   (c) a plurality of fluid outlet modules extending from each of said plenum chambers toward the path of travel of said sheets of glass, said modules each terminating in a nozzle positioned so as to direct a heat exchange fluid toward said path of travel, and at least partially support sheets of glass moving along said path, each fluid outlet module of one of said plenum chambers being offset with other plenum chamber, said fluid outlet modules each being of sufficient length to provide an exhaust space between each plenum chamber and the path of travel of said sheets of glass, and
   (d) a plurality of fluid outlet modules extending from said upper and lower plenum chambers across the entrance therebetween, each of said last named fluid outlet modules from the upper plenum chamber being aligned with a fluid outlet module from the lower plenum chamber.

References Cited

UNITED STATES PATENTS 3,338,697   8/1967   McMaster et al. _____ 65—25 X

ARTHUR D. KELLOGG, Primary Examiner

U.S. Cl. X.R.

65—114, 119, 182, 350, 351